April 11, 1939.  W. L. TAYLOR  2,154,365
TRAILER
Filed Oct. 31, 1938    3 Sheets-Sheet 1

Inventor
W. L. Taylor
By Clarence A. O'Brien
and Hyman Berman
Attorneys

April 11, 1939.  W. L. TAYLOR  2,154,365
TRAILER
Filed Oct. 31, 1938  3 Sheets-Sheet 2
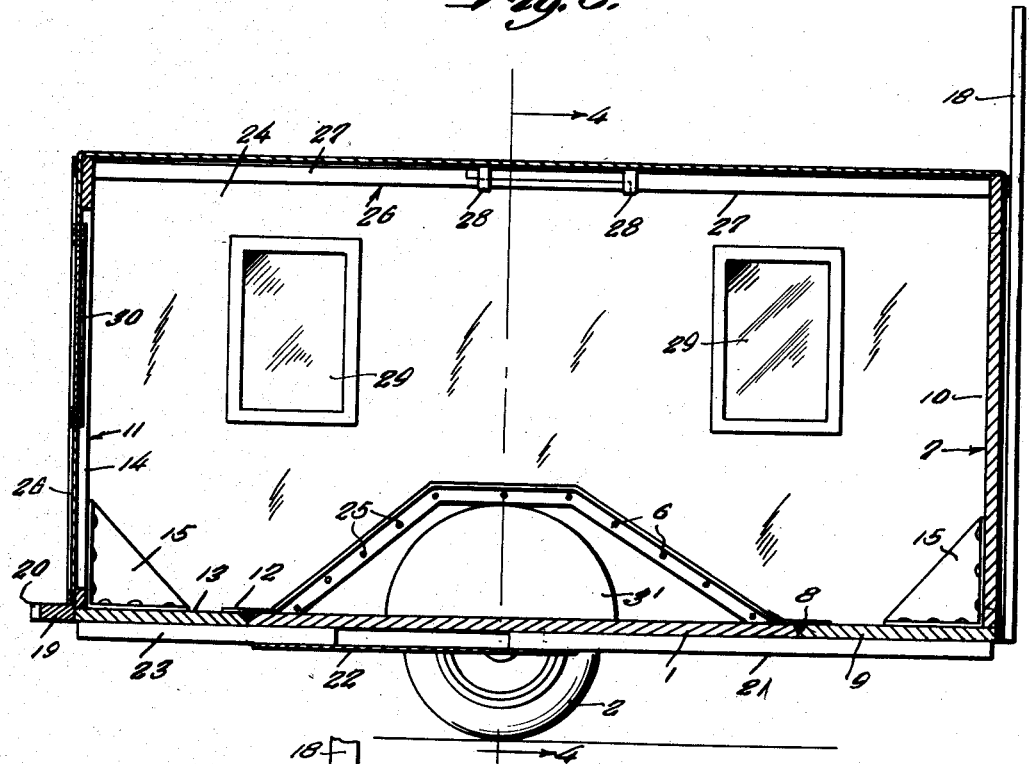
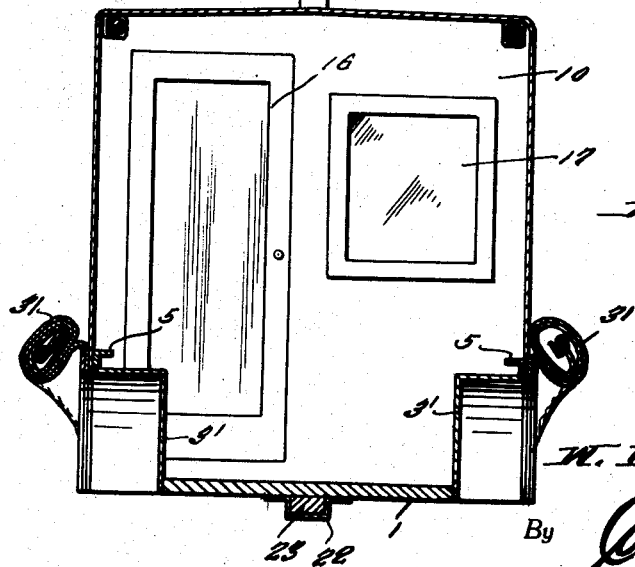
Inventor
W. L. Taylor
By Clarence A. O'Brien
and Hyman Berman
Attorneys

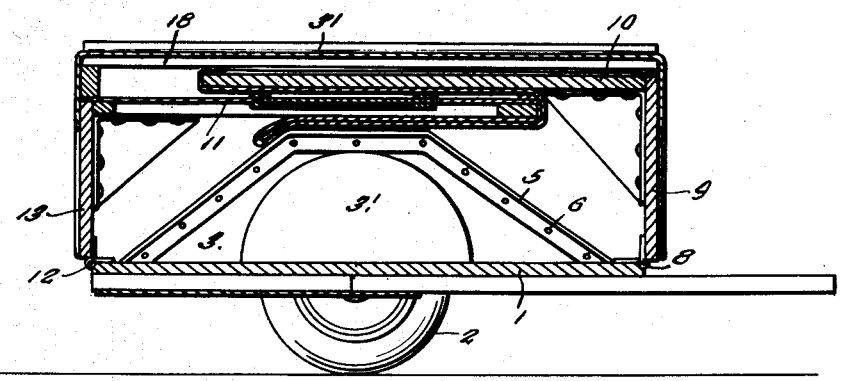
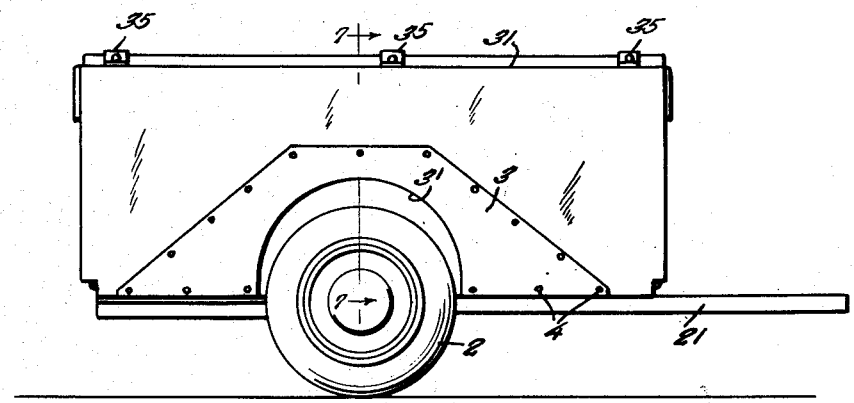
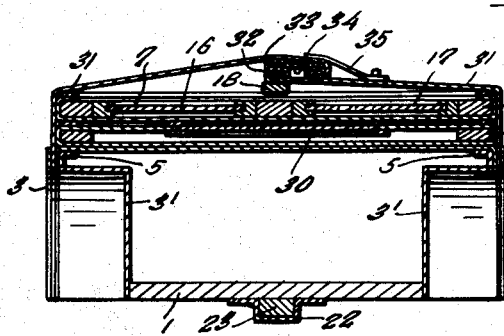

Patented Apr. 11, 1939

2,154,365

UNITED STATES PATENT OFFICE 2,154,365

TRAILER

William L. Taylor, Roanoke, Va., assignor of one-half to W. V. Fielder, Baltimore, Md.

Application October 31, 1938, Serial No. 238,006

4 Claims. (Cl. 296—23)

My invention relates to improvements in automobile trailers of the collapsible type.

The principal object of the invention is to provide a low cost, light weight, trailer adapted to be quickly collapsed, or folded, to reduce the height thereof and also the length for safe transportation on the road in compact form.

Another object is to provide a trailer equipped for the purpose above set forth which is covered in its collapsed, or folded, form so as to protect the same against injury from rain, wind and dust.

Other and subordinate objects are also comprehended by my invention all of which, together with the precise nature of my improvements, will be readily understood when the succeeding description and the claims are read with reference to the drawings accompanying and forming part of this specification.

In said drawings:

Figure 3 is a view in longitudinal vertical section taken on the line 3—3 of Figure 2 looking in the direction indicated by the arrows.

Figure 4 is a view in transverse vertical section taken on the line 4—4 of Figure 3 looking in the direction indicated by the arrows.

Figure 5 is a view in longitudinal central section similar to Figure 1 showing the parts collapsed or folded.

Figure 6 is a view in side elevation with the parts collapsed or folded; and

Figure 7 is a view in transverse section taken on the line 7—7 of Figure 6 looking in the direction indicated by the arrows.

Figure 1:
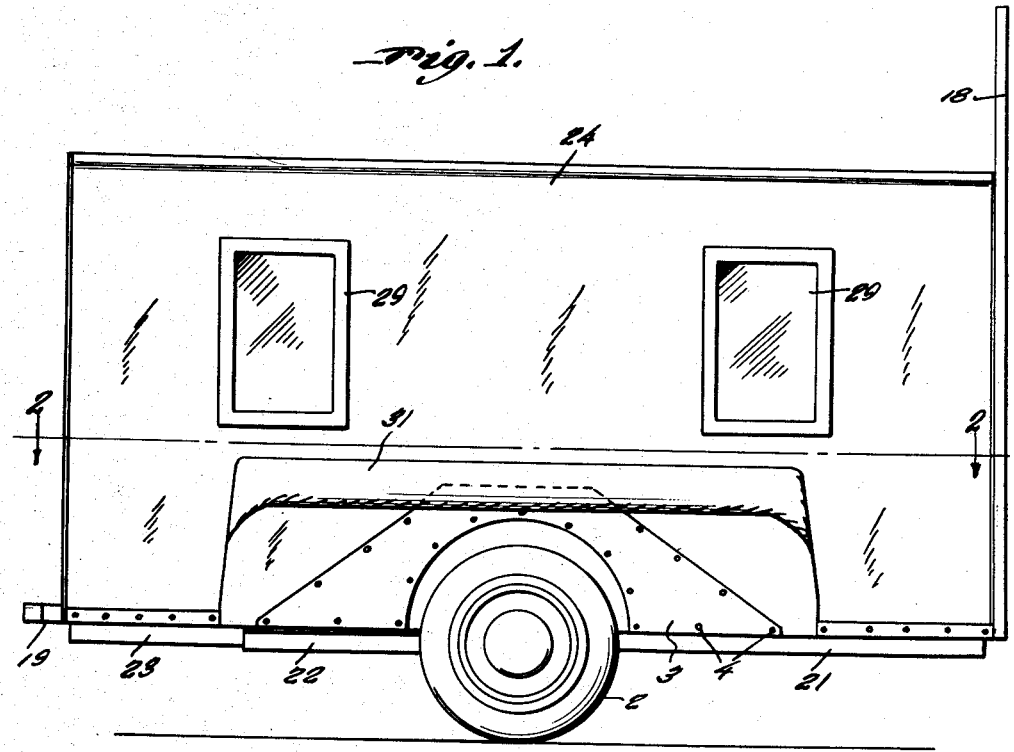
Figure 1 is a view in side elevation of a preferred form of my improved trailer.
Figure 2:
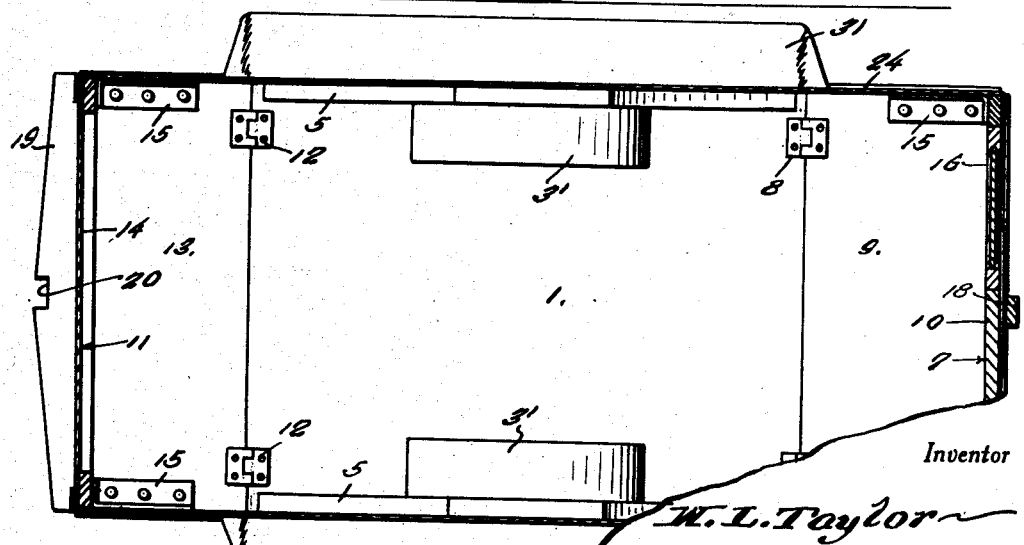
Figure 2 is a view in horizontal section taken on the line 2—2 of Figure 1 looking downwardly as indicated by the arrows.

Referring to the drawings by numerals, the illustrated embodiment of my improved trailer comprises a body including a platform-like floor 1 of rectangular shape and preferably of wood supported intermediate its ends by a pair of rubber tired wheels 2 through the medium of suitable stub axles (not shown). A pair of sheet metal side plates 3 of truncated cone shape and having central mud guards 4 extending inwardly therefrom are secured, as at 3', to opposite side edges of said floor 1 in upstanding position, said plates being reinforced along the upper edges thereof by angle irons 5 riveted to the inner faces of said plates, as at 6.

A right-angled front end section 7, preferably of wood, is hinged, as at 8, to the front end of the floor 1 to fold upwardly and rearwardly on said end, or to unfold forwardly and downwardly thereon, said section comprising a panel 9 forming in the unfolded position of the section 7 a front extension of said floor 1, and a frame 10 forming in said unfolded position of the section 7 a vertical front wall structure for the trailer body. As best shown in Figure 5, in the unfolded, or collapsed, position of said section 7, the panel 9 forms a front vertical end for the trailer body and the frame 10 extends rearwardly and horizontally being supported as presently described.

At the rear of the floor 1 is a similar right-angled rear section 11, hinged, as at 12, to said floor to fold upwardly and forwardly, or, to unfold rearwardly and downwardly, said section 11 comprising a panel 13 forming in the unfolded position of said section a rear extension of the floor 1, and a frame section 14 forming in said position of the section 11 a vertical rear wall structure for the body. In the folded position of the rear section 11, the panel 13 provides a rear end for the trailer body and the frame section 14 folds horizontally over the angle irons 5 to be supported thereby and whereby the folded position of said section 11 is established.

Corner angle braces 15 secure the panels 9 and 13 and the related frames 7 and 14 together.

The frame 10, or front wall structure, has incorporated therein a door 16 and a window 17 and has secured to the outer face thereof, in any suitable manner, a handling pole 18 adapted in the folded position of the section to extend centrally and rearwardly of said frame 10. The rear section 11 has suitably secured thereto an extension 19 of the panel 13 which has a central outer edge notch 20 therein in which the free end of said pole 18 fits frictionally in the folded position of the sections 7 and 11, whereby the folded position of the section 7 is established.

A draft bar 21 is secured in any suitable manner to the under side of the floor 1 in the longitudinal center thereof to extend forwardly beneath the panel 9 in the unfolded position of the section 7 and thereby support the latter in said unfolded position and establish such position. A socket member 22 is provided on the under side of said floor 1 to form an extension of the draft bar 21. Fitting into said socket member 22 is a slide bar 23 adapted to be extended rearwardly out of said member to support the panel 13 in the unfolded position of the section 11 and establish said position of said section.

The sides, top, and rear end of the trailer body are formed by a hood, or canopy, 24 of suitable flexible material such as canvas, or duck, having the front edges thereof bent over and suitably secured to the top edge and sides of the frame 10, its bottom edges suitably secured to the angle irons 5, floor 1 and panels 9 and 13, said hood having a rear flap 26 covering the rear side of the frame 14 and suitably secured to said frame. The length of the hood 24 is such that in the described unfolded positions of the sections 7 and 11 said hood between said sections is stretched taut by the frames 7 and 11 of said sections, and also by the extensions 9 and 13. A pair of upper side compression members are provided to be interposed between the upper corners of the frames 10 and 14 and force the same outwardly, relatively, to tension the hood 24 in the unfolded position of the sections 7 and 11, said members each comprising a pair of bars 27 rabbeted to fit together flush in end to end overlapping relation and detachably secured together in such relation by means of a pair of keeper rings 28 suitably secured to one section. At desired locations therein side and end windows 29 and 30 may be incorporated in said hood 24.

In folding the described parts of the trailer body, the members 27 are first removed, the rear section 11 then folded forwardly and downwardly into the position already described and the front section 7 then folded rearwardly and downwardly by means of the handling pole 18, the free end of the latter being forced into the notch 20 of extension 19. The slack of the hood 24 is folded upon itself in between the frames 10 and 14 and around and under frame 14 as best shown in Figures 5 and 7. The slide bar 23 is then shoved into the socket member 22 in an out-of-the-way position. Thus the over-all length of the body is shortened by the combined width of the panels 9 and 13, and the overall height of the body reduced to a height corresponding substantially to the width of the panels 9, 14 plus that of the extension 19.

It will, of course, be understood that the frames 10 and 14 are of the proper height to provide head room in the body when the sections 7 and 11 are unfolded.

In addition to the above, the trailer of my invention includes a pair of side cover flaps 31 of canvas, or other suitable material, for the folded parts described, said flaps having lower edges secured, as by the rivets 6, to the frames 3 between the same and the angle bars 5, said flaps being of the proper shape to fit over the described folded part and to extend over the front and rear of the body as formed by the folded panels 9 and 13. The flaps 31 have free longitudinal edges designed to be secured together in the longitudinal center of the folded parts by the following means. One of said flaps 31 has crimped to the free edge thereof a bar 32 extending along said edge and bent back upon itself to form a hook-shaped free edge 33 along the same. The other flap 31 has crimped to the free edge thereof a flat bar 34 extending along said edge and adapted to fit in the hooked edge 33 of bar 32 and to interlock flat with the latter. The flaps 31 are of sufficient width so that when the bars 32 and 34 are interlocked in the manner described, said interlocked bars may be rolled over into an inverted position to stretch the flaps 31 taut. Keeper bars 35 are pivoted on one flap 31 to be swung over the inverted bars 32 and 34 and hold the same in such position in opposition to the tension exerted against the same by the pull of the flaps 31.

When it is desired to uncover the folded part, the keeper bars 35 may be swung from over said inverted bars 32 and 34 so that the latter may roll under the pull of the flaps 31 out of inverted position and be detached. The flaps 31 may then be rolled down against the plates 3 and secured in such rolled condition in any suitable manner as by clips (not shown).

The members 26 may be disassembled by detaching the bars 27, in a manner which will be clear, and stored on the floor 1 prior to the folding operation.

The foregoing will, it is believed, suffice to impart a clear understanding of my invention without further explanation.

Manifestly the invention, as described, is susceptible of modification without departing from the inventive concept and right is herein reserved to such modifications as fall fairly within the scope of the subjoined claims.

What I claim is:

1. A trailer body comprising a rectangular floor having front and rear ends, respectively, a pair of rightangled front and rear sections hinged to the front and rear ends of said floor, respectively, for folding and unfolding movement vertically on said ends toward and from each other, respectively, said sections unfolded providing front and rear extensions of said floor and front and rear wall structures for said body, and a single piece of flexible material attached to said sections and to the sides of the floor for stretching taut into hood formation under unfolding of said sections and collapsing into folded formation under unfolding of said sections.

2. A trailer body comprising a rectangular floor having front and rear ends, respectively, a pair of rightangled front and rear sections hinged to the front and rear ends of said floor, respectively, for folding and unfolding movement vertically on said ends toward and from each other, respectively, said sections unfolded providing front and rear extensions of said floor and front and rear wall structures for said body, and a single piece of flexible material attached to said sections and to the sides of the floor for stretching taut into hood formation under unfolding of said sections and collapsing into folded formation under unfolding of said sections, and bar-like compression members to be removably interposed between said sections and hold the same unfolded in opposition to the pull of said material.

3. A trailer body comprising a rectangular floor having front and rear ends, respectively, a pair of rightangled front and rear sections hinged to the front and rear ends of said floor, respectively, for folding and unfolding movement vertically on said ends toward and from each other, respectively, said sections unfolded providing front and rear extensions of said floor and front and rear wall structures for said body, and a single piece of flexible material attached to said sections and to the sides of the floor for stretching taut into hood formation under unfolding of said sections and collapsing into folded formation under unfolding of said sections, and a pair of cover flaps of flexible material secured to opposite sides of said floor for stretching over the folded sections, said flaps having free edges provided with means thereon for stretching said flaps taut and securing said free edges together.

4. A trailer body comprising a rectangular floor having front and rear ends, respectively, a pair of rightangled front and rear sections hinged to the front and rear ends of said floor, respectively, for folding and unfolding movement vertically on said ends toward and from each other, respectively, said sections unfolded providing front and rear extensions of said floor and front and rear wall structures for said body, and a single piece of flexible material attached to said sections and to the sides of the floor for stretching taut into hood formation under unfolding of said sections and collapsing into folded formation under unfolding of said sections, and a pair of cover flaps of flexible material secured to opposite sides of said floor for stretching over the folded sections, said flaps having free edges provided with means thereon for stretching said flaps taut and securing said free edges together, said means comprising a pair of metal bars adapted to interlock flat one against the other and for rolling of said free edges to stretch the flaps, and means on one flap for cooperation with said rolled edges to prevent unrolling of the same.

WILLIAM L. TAYLOR.